United States Patent
Yi et al.

(10) Patent No.: US 10,582,441 B2
(45) Date of Patent: Mar. 3, 2020

(54) METHOD AND APPARATUS FOR TRANSMITTING SYSTEM INFORMATION FOR CELLULAR INTERNET-OF-THINGS IN WIRELESS COMMUNICATION SYSTEM

(71) Applicant: LG ELECTRONICS INC., Seoul (KR)

(72) Inventors: Yunjung Yi, Seoul (KR); Bonghoe Kim, Seoul (KR); Hyunsoo Ko, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,283

(22) PCT Filed: Jun. 13, 2016

(86) PCT No.: PCT/KR2016/006231
§ 371 (c)(1),
(2) Date: Nov. 27, 2017

(87) PCT Pub. No.: WO2016/200230
PCT Pub. Date: Dec. 15, 2016

(65) Prior Publication Data
US 2018/0160361 A1    Jun. 7, 2018

Related U.S. Application Data

(60) Provisional application No. 62/173,973, filed on Jun. 11, 2015, provisional application No. 62/183,693, filed on Jun. 23, 2015.

(51) Int. Cl.
*H04W 48/12*    (2009.01)
*H04W 48/10*    (2009.01)
(Continued)

(52) U.S. Cl.
CPC .......... *H04W 48/10* (2013.01); *H04L 1/0046* (2013.01); *H04L 5/0053* (2013.01); *H04W 48/12* (2013.01);
(Continued)

(58) Field of Classification Search
CPC .............................. H04W 48/10; H04W 48/12
See application file for complete search history.

(56) References Cited

U.S. PATENT DOCUMENTS

2010/0142467 A1*  6/2010  Tiirola .................. H04L 5/0053
                                                            370/329
2011/0075703 A1*  3/2011  Jiang ...................... H04B 1/713
                                                            375/132

(Continued)

OTHER PUBLICATIONS

PCT International Application No. PCT/KR2016/006231, International Search Report dated Oct. 11, 2016, 2 pages.

(Continued)

*Primary Examiner* — Angel T Brockman
(74) *Attorney, Agent, or Firm* — Lee Hong Degerman Kang Waimey

(57) ABSTRACT

A method and apparatus for transmitting system information in a wireless communication system is provided. A base station (BS) configures a physical broadcast channel (PBCH) in a subband including a set of consecutive subcarriers in a frequency domain, and transmits master information via the PBCH.

5 Claims, 9 Drawing Sheets

(51) Int. Cl.
*H04L 1/00* (2006.01)
*H04L 5/00* (2006.01)
*H04W 72/04* (2009.01)
*H04W 72/00* (2009.01)

(52) U.S. Cl.
CPC ......... *H04W 72/042* (2013.01); *H04L 5/0007* (2013.01); *H04L 5/0069* (2013.01); *H04W 72/005* (2013.01)

(56) References Cited

U.S. PATENT DOCUMENTS

| | | | |
|---|---|---|---|
| 2012/0188877 A1* | 7/2012 | Chin | H04W 24/10 370/241 |
| 2013/0077582 A1 | 3/2013 | Kim et al. | |
| 2013/0094457 A1 | 4/2013 | Seo et al. | |
| 2013/0107790 A1* | 5/2013 | Lee | H04W 4/06 370/312 |
| 2013/0136098 A1 | 5/2013 | Li et al. | |
| 2015/0146629 A1 | 5/2015 | Ranta-aho et al. | |
| 2015/0223182 A1* | 8/2015 | Kim | H04W 52/146 370/329 |
| 2015/0271864 A1* | 9/2015 | Nigam | H04W 48/16 370/252 |

OTHER PUBLICATIONS

Intel Corporation, "On narrowband operations and timing relationships for MTC", R1-152613, 3GPP TSG RAN WG1 Meeting #81, May 2015, 6 pages.

\* cited by examiner

METHOD AND APPARATUS FOR TRANSMITTING SYSTEM INFORMATION FOR CELLULAR INTERNET-OF-THINGS IN WIRELESS COMMUNICATION SYSTEM

CROSS-REFERENCE TO RELATED APPLICATIONS

This application is the National Stage filing under 35 U.S.C. 371 of International Application No. PCT/KR2016/006231, filed on Jun. 13, 2016, which claims the benefit of U.S. Provisional Applications Nos. 62/173,973, filed on Jun. 11, 2015 and 62/183,693, filed on Jun. 23, 2015, the contents of which are all hereby incorporated by reference herein in their entirety.

BACKGROUND OF THE INVENTION

Field of the Invention

The present invention relates to wireless communications, and more particularly, to a method and apparatus for transmitting system information for cellular internet-of-things (CIoT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Machine-to-machine (M2M) communication represents a significant growth opportunity for the 3GPP ecosystem. To support the so called "Internet-of-things" (IoT), 3GPP operators have to address usage scenarios with devices that are power efficient (with battery life of several years), can be reached in challenging coverage conditions, e.g. indoor and basements and, more importantly, are cheap enough so that they can be deployed on a mass scale and even be disposable.

Cellular IoT (CIoT) devices may require very low throughput, may not have stringent delay requirements like those required for real time services, may not need to support circuit switched services, may not need to support inter-radio access technology (RAT) mobility and may perform intra-RAT mobility by cell reselection. For CIoT, some additional features may be required.

SUMMARY OF THE INVENTION

The present invention provides a method and apparatus for transmitting system information for cellular internet-of-things (CIoT) in a wireless communication system. The present invention discusses mechanisms to transmit system information for CIoT system.

In an aspect, a method for transmitting, by a base station (BS), system information in a wireless communication system is provided. The method includes configuring a physical broadcast channel (PBCH) in a subband including a set of consecutive subcarriers in a frequency domain, and transmitting master information via the PBCH.

In another aspect, a method for transmitting, by a base station (BS), a physical downlink control channel (PDCCH) in a wireless communication system is provided. The method includes allocating different subcarriers to each coverage class, allocating a PDCCH resource for the each coverage class in subcarriers corresponding to the each coverage class, and transmitting the PDCCH by using the PDCCH resource corresponding to the each coverage class.

System information can be transmitted efficiently for CIoT.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTEadvance (LTE-A) is an evolution of the 3GPP LTE. For clarity, this application focuses on the 3GPP LTE/LTE-A. However, technical features of the present invention are not limited thereto.

Figure 1:
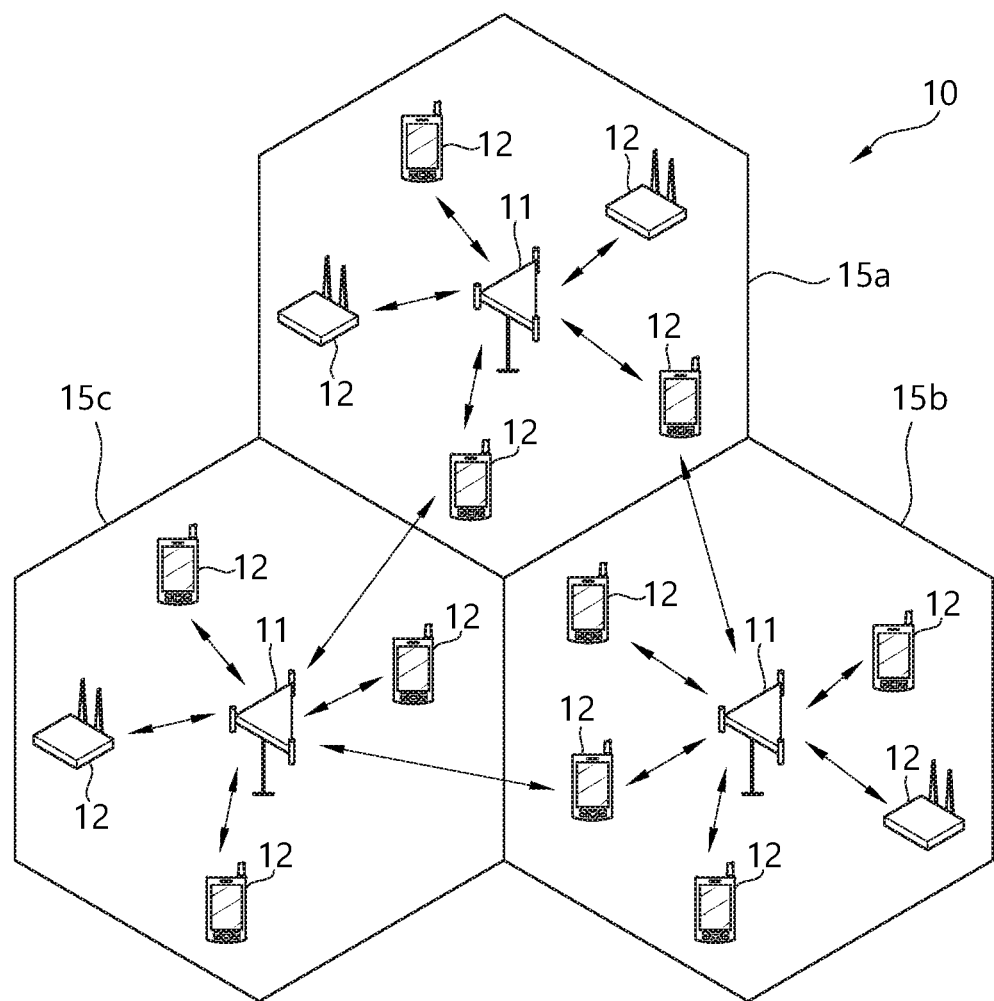
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
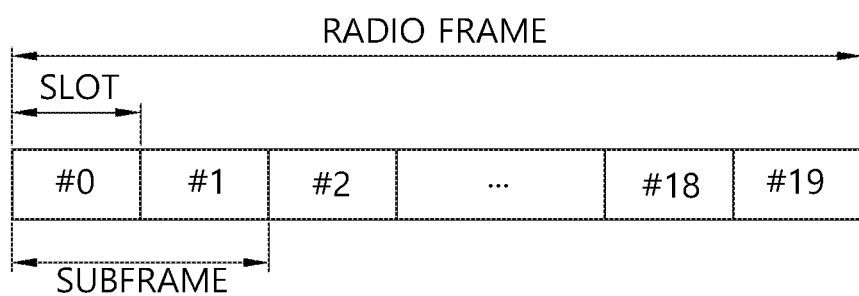
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

System information is divided into the MasterInformationBlock (MIB) and a number of SystemInformationBlocks (SIBs). MasterInformationBlock defines the most essential physical layer information of the cell required to receive further system information. The MIB is mapped on the broadcast control channel (BCCH) and carried on broadcast channel (BCH) while all other SI messages are mapped on the BCCH and dynamically carried on DL-SCH where they can be identified through the system information radio network temporary identity (SI-RNTI). Both the MIB and SystemInformationBlockType1 use a fixed schedule with a periodicity of 40 and 80 ms respectively while the scheduling of other SI messages is flexible and indicated by SystemInformationBlockType1.

Physical broadcast channel (PBCH) is mapped to the BCH. The coded BCH transport block is mapped to four subframes within a 40 ms interval. 40 ms timing is blindly detected, i.e. there is no explicit signaling indicating 40 ms timing. Each subframe is assumed to be self-decodable, i.e. the BCH can be decoded from a single reception, assuming sufficiently good channel conditions.

Cellular internet-of-things (CIoT) is described. Performance objectives of CIoT may include improved indoor coverage, support of massive number of low throughput devices, reduced complexity, improved power efficiency, and latency.

For one of physical layer aspects and radio access protocols for clean slate concepts of CIoT, narrowband M2M (narrowband machine-to-machine) may be considered. To support massive number of low throughput machine-type communication (MTC) devices (UEs) with a limited number of 200 kHz resource blocks, each resource block is divided into a large number of narrowband physical channels which are individually modulated and pulse-shaped. Channelization is done in a frequency division multiplexed (FDM) manner, for both the UL and the DL.

The DL channelization supports efficient frequency re-use, which is important for maintaining overall system capacity, and low complexity equalization at the UE receiver. It also allows separation of traffic for different UE coverage classes onto different physical channels which allows easier optimization of media access control (MAC) characteristics, such as latency, for each coverage class. The UL channelization provides a very efficient means to improve the UL coverage without compromising the UL capacity. The channel spacing in the uplink is a fraction (e.g. ⅓) of that in the DL. This creates many more physical channels in the UL than in the DL. With a significantly higher number of parallel UL data transmissions, the aggregate UL transmit power increases proportionately, and so does the achievable UL capacity. Other techniques such as symbol rate spreading and burst rate repetition may be employed in both the UL and the DL to further extend the coverage.

The duration of a burst may be variable, and a physical channel may be only defined in the frequency domain, not in the time domain (i.e. there is only one physical channel per carrier). Different types of bursts can be carried on a physical channel, depending on the channel type.

The minimum system bandwidth may be a single resource block. Additional resource blocks can be used to increase network capacity, and can have the additional benefit of providing frequency diversity if they are sufficiently separated in frequency. The choice of resource block bandwidth may allow the system to be deployed by re-farming one or more carriers. However, other deployment options may also be available, such as deploying the system stand-alone in any suitable fragment of spectrum, or potentially within the guard-bands of another system.

The base station may operate in radio frequency (RF) full duplex mode in order to maximize network capacity. MTC devices may operate in half duplex mode to reduce the RF cost.

As described above, to minimize the hardware requirement/cost and battery power of a UE in CIoT, small bandwidth such as 200 kHz devices may be considered. For a new device, a new frame structure and new data scheduling mechanisms may be considered. Mainly, the following two aspects may be considered.

(1) A long duration TTI may be specified. While 1 ms TTI is defined in current LTE, a long TTI such as 10 ms TTI may be defined for a new low complexity UE.

(2) A minimum number of channels/designs may be supported. For example, one channel with different content may be used for different purpose. For example, data channel such as physical downlink shared channel (PDSCH) may be used to transmit data and control information.

In terms of cell association, further simplification may be considered. For example, short broadcast may be transmitted without explicit cell association. Also, measurement requirement may be further relaxed or removed to minimize power consumption. In terms of waveform design, waveform used for GSM, high speed packet access (HSPA) or LTE may be reused or tailorized mainly for a long TTI and/or small bandwidth. The characteristics of a new system may be the main UE requirement in terms of bandwidth and/or data rate and/or operating signal to interference and noise ratio (SINR) range.

Figure 3:
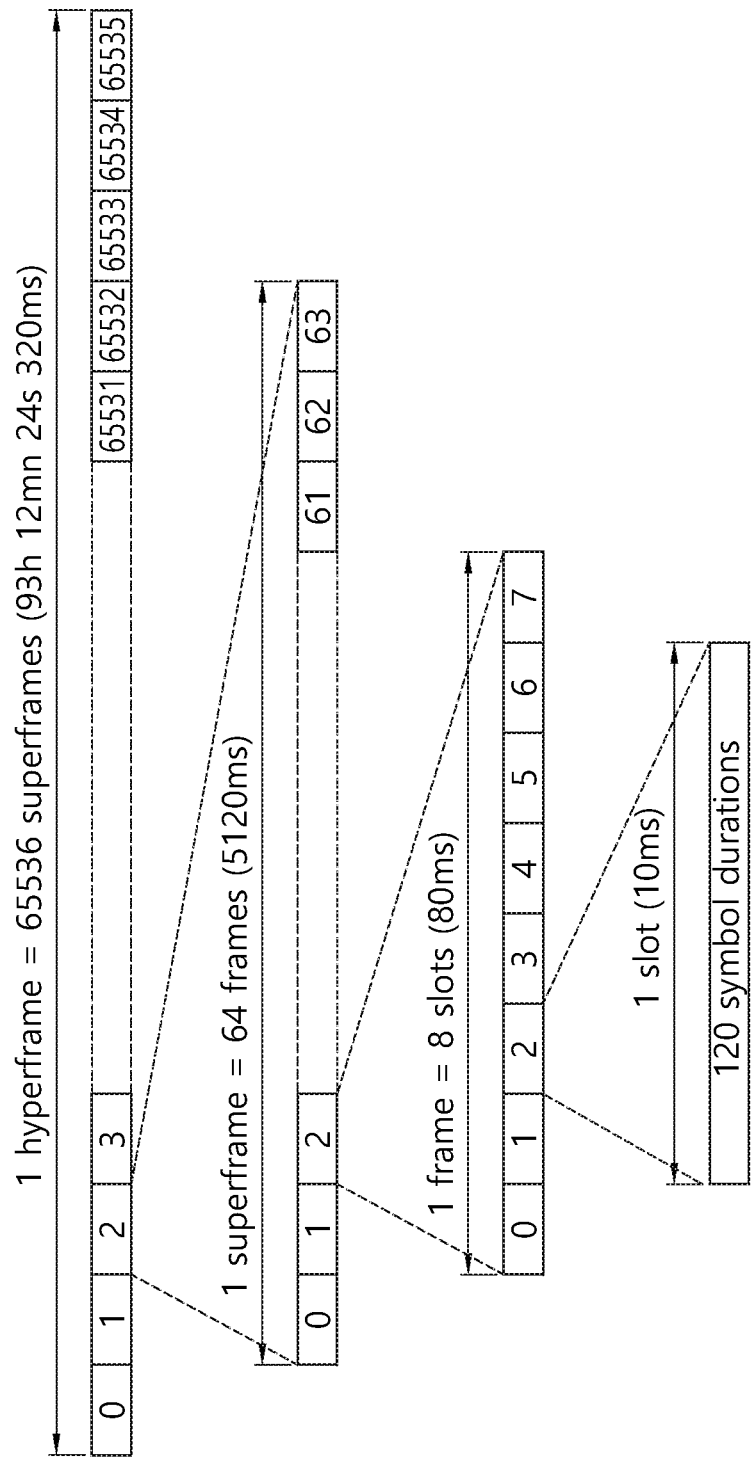
FIG. 3 shows an example of a DL time structure with a long TTI for CIoT.

FIG. 3 shows an example of a DL time structure with a long TTI for CIoT. Referring to FIG. 3, the longest recurrent time period of the time structure is called a hyperframe and has a duration of 335544320 ms (or 93 h 12 mn 24 s 320 ms). One hyperframe is subdivided into 65536 superframes which each have a duration of 5120 ms. Superframes are numbered modulo this hyperframe (superframe number, or SFN, from 0 to 65535). One superframe is subdivided into 64 frames which each have a duration of 80 ms. Frames are numbered modulo this superframe (frame number, or FN, from 0 to 63). A frame is the time unit for transmission of the broadcast signal and synchronization information on physical broadcast and synchronization channel (PBSCH).

One frame is also the minimum interval between transmissions of successive downlink control information (DCI) bursts on PDSCH. One frame comprises eight slots which are numbered modulo this frame (slot number, or SN, from 0 to 7). One slot lasts 10 ms and is the minimum scheduling unit on PDSCH. The eight slots in one frame belong to the same physical channel.

For CIoT, it is possible that OFDMA is used for DL transmission, whereas frequency division multiplexing (FDM) is used for UL transmission. However, SC-FDM may also be used for UL transmission in CIoT, which is used for narrowband IoT (NB-IoT) in the current LTE. If OFDMA is used for DL transmission, in order to enhance the performance, wideband transmission of system information may be considered. Since there are multiple information group which can be transmitted with different periodicity, code rate, and/or resources, as described above, the first system information may be called as "MasterInformation (MI)" or MIB, and the next system information may be called as "SystemInformation (SI)" (e.g. SI1, SI2, . . . ) or SIB.

Hereinafter, a method for transmitting system information for CIoT according to an embodiment of the present invention is described. Specifically, a method for transmitting MI via PBCH according to an embodiment of the present invention is described.

In terms of transmitting MI, at least one of the following options may be considered for periodicity/time location of PBCH for MI transmission.

(1) Option 1: MI may be transmitted with primary synchronization signal (PSS)/secondary synchronization signal (SSS). If there are multiple PSS/SSS transmissions in a frame, multiple MI transmission may occur in a frame. The same content for MI may be repeated within a frame. Since a UE may not know the timing of PSS/SSS transmission in a frame, when using this approach, a UE may not know the boundary of the frame. To know the frame boundary, different sequences may be used for either PSS or SSS, depending on the location or index within a frame (e.g., 0 for the first PSS or SSS, 1 for the second PSS or SSS, etc.). By detecting the index of SS in the frame, the UE may also know that how many MI repetitions may occur in the frame. Further, depending on coverage class of the UE, the UE may determine how many MI repetitions should be received before attempting decoding, and determine the location where MI detection should be performed. For example, if PSS/SSS are received m times in a frame, m times of MI repetitions may occur in the frame. Each UE may determine the number of required repetitions/aggregations depending on its coverage level. When this type of mechanism is used, reference signal (RS) may be used for MI decoding (i.e. channel estimation for MI decoding) as well as for channel status indication measurement. Furthermore, the RS may also be used for fine tracking such as for time/frequency tracking.

(2) Option 2: MI may be transmitted once per frame. In this case, the location of PBCH may be prefixed either in the start of each frame or end of each frame or in the center of each frame. Comparing to option (1) described above, this option may offer less gain from the time diversity perspective. Particularly, considering that some RS may be used commonly for UEs for tracking purpose, it may be desirable that a common channels are transmitted uniformly distributed over a frame.

(3) Option 3: MI may be transmitted in multiple locations in a frame independent from PSS/SSS. Independent from location of PSS/SSS, multiple locations (prefixed) may be used for MI transmission, similar to option (1) described above. The difference between option (1) and option (3) is that if PSS/SSS is transmitted in less than 1 slot or a basic resource allocation block, in option (1), MI may be transmitted in those remaining resources in a slot, whereas in option (3), the minimum resource usable may be one resource allocation block.

In terms of transmitting MI, at least one of the following options may be considered for frequency location of PBCH for MI transmission.

(1) Option 1: MI may be transmitted over the entire system bandwidth of a carrier (i.e. wideband transmission) For example, if a system bandwidth has 48 subcarriers, MI may be transmitted over 48 subcarriers.

(2) Option 2: MI may be transmitted over a set of consecutive subcarriers (i.e. subband transmission). For example, the entire system bandwidth may be divided to 'k' subbands, and one subband, among k subbands, may be used for MI transmission. One subband for MI transmission may be determined e.g. by (cell ID % k).

When this option is used, frequency hopping across the system bandwidth may be applied per each MI transmission within a frame. Since a UE does not know the frame number, hopping pattern requiring frame number may not work for MI transmission. Accordingly, the hopping pattern may be determined by cell ID. For example, the location of subband i for j-th MI transmission within a frame may be determined by Equation 1 below.

$$((hopping\_offset*j) \% k+(cell\ ID \% k)) \% k \quad \text{Equation 1}$$

In other words, frequency location of MI transmission may be hopped with a hopping offset in each MI transmission. The hopping offset may be determined based on cell ID, e.g. by (hopping_offset=cell_ID % maximum_hopping_offset). Based on the hopping function, a UE may determine the frequency location where MI transmission occurs in each transmission.

(3) Option 3: MI may be transmitted over non-continuous 'm' subcarriers. That is, MI may be transmitted over the entire system bandwidth where discontinuous m subcarriers is used for MI transmission. For example, if a system bandwidth has 48 subcarriers, MI may be transmitted over m subcarriers which may be uniformly distributed over the system bandwidth. For example, the first subcarrier may be defined as 1st_subcarrier_MI=(cell ID % the number of subcarriers in the system bandwidth), and the next subcarrier may be defined as (1st_ subcarrier_MI+ceil (the number of subcarriers in the system bandwidth/m)) % the number of subcarriers in the system bandwidth), and so on. In other words, discontinuous subcarriers uniformly distributed over the entire system bandwidth may be used for MI transmission in each transmission. Similar to option 2 described above, frequency hopping may be used. Even when frequency hopping is used, similar mechanism may be considered which determines the first subcarrier index per each transmission, and the subsequent subcarrier index, and so on.

Figure 4:
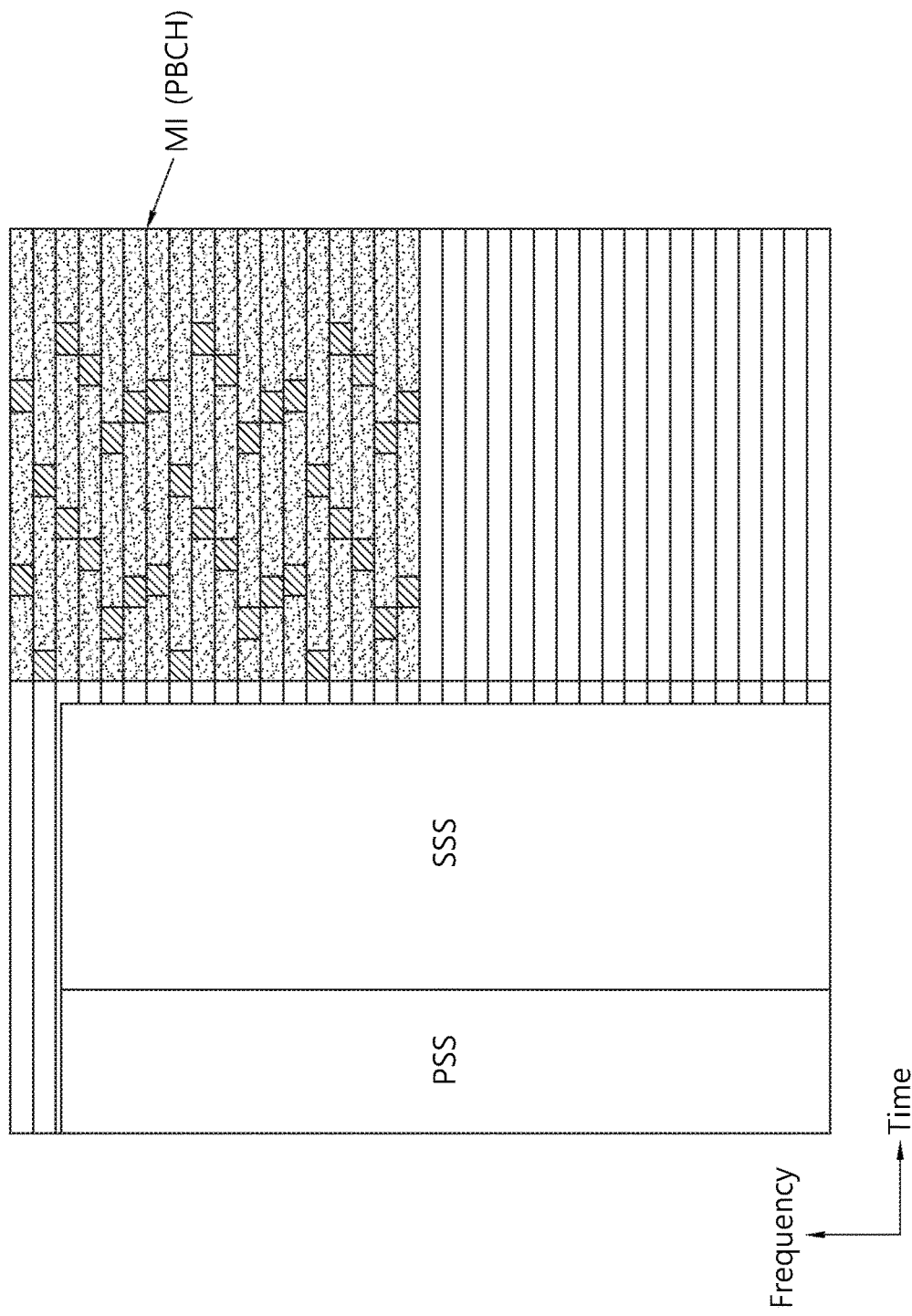
FIG. 4 shows an example of location of PBCH for MI transmission according to an embodiment of the present invention.

FIG. 4 shows an example of location of PBCH for MI transmission according to an embodiment of the present invention. Referring to FIG. 4, for time location of PBCH for MI transmission, option (2) is used. Accordingly, MI is transmitted once per frame. In this embodiment, the location of PBCH may be prefixed either in end of each frame. Further, for frequency location of PBCH for MI transmission, option (2) is used. Accordingly, MI is transmitted over a set of consecutive subcarriers (i.e. subband transmission).

In terms of RS (or pilot), the RS pattern may be determined based on cell ID. Further, the same RS pattern may be used for all MI transmission. Further, the RS pattern may be uniformly distributed across subcarriers and uniformly distributed in time-domain as well. For example, the location of symbol where the first RS is located may be determined as ((maximum_symbol_in_a_frame/2) % cell_ID), and the location of symbol where the second RS is located location in the corresponding subcarrier may be determined as ((maximum_symbol_in_a_frame/2) % cell_ID)+((maximum_symbol_in_a_frame/2). For the next subcarrier, the first RS location may be determined as ((maximum_symbol_in_a_frame/2+i) % cell_ID) where i may be determined either based on the subcarrier index or the index of subcarrier used for MI transmission. Further, RS may be scrambled with cell ID, and sequence may be based on Zadoff-Chu (ZC) sequence.

Further, in terms of placing RS, when PBCH is not allocated over the entire system bandwidth (i.e. subband transmission), one of the following options may be considered.

(1) Subcarriers used for PBCH may carry RS (2) Regardless of whether PBCH is allocated or not, all subcarriers may carry RS.

Both options may offer some benefits. To enhance the performance and allow utilizing RS for other purposes as well such as tracking, it may be desirable to transmit RS in a slot or half-slot or subframe where PBCH is allocated over the entire system bandwidth. In this case, not all subcarriers are used for RS. Rather, discontinuous subcarriers may be used for RS. For example, only 1 subcarrier in every n subcarriers may carry RS to minimize the overhead of RS. Locations of those subcarriers may be determined based on cell ID such that the frequency location among neighbour cells may be minimized.

Similar RS transmission mechanism may also be used for data transmission as well, regardless of scheduled subcarriers for control and/or data transmission. In this case, the network may transmit RS continuously in each slot regardless of scheduling. Tracking may be performed based on those RS. Alternatively, UE-specific RS may be transmitted for PDSCH transmission, whereas a cell common RS similar to PBCH RS pattern may be used for control transmission. For example, if PDSCH is used for both control and data transmission, different RS pattern may be used depending on whether PDSCH carries control or data. Furthermore, RS pattern may also be different from each other depending on whether PDSCH carries unicast data or broadcast data. Alternatively, the same RS pattern and sequence may be used where only transmission of RS may be determined by the used subcarriers for the transmission.

Figure 5:
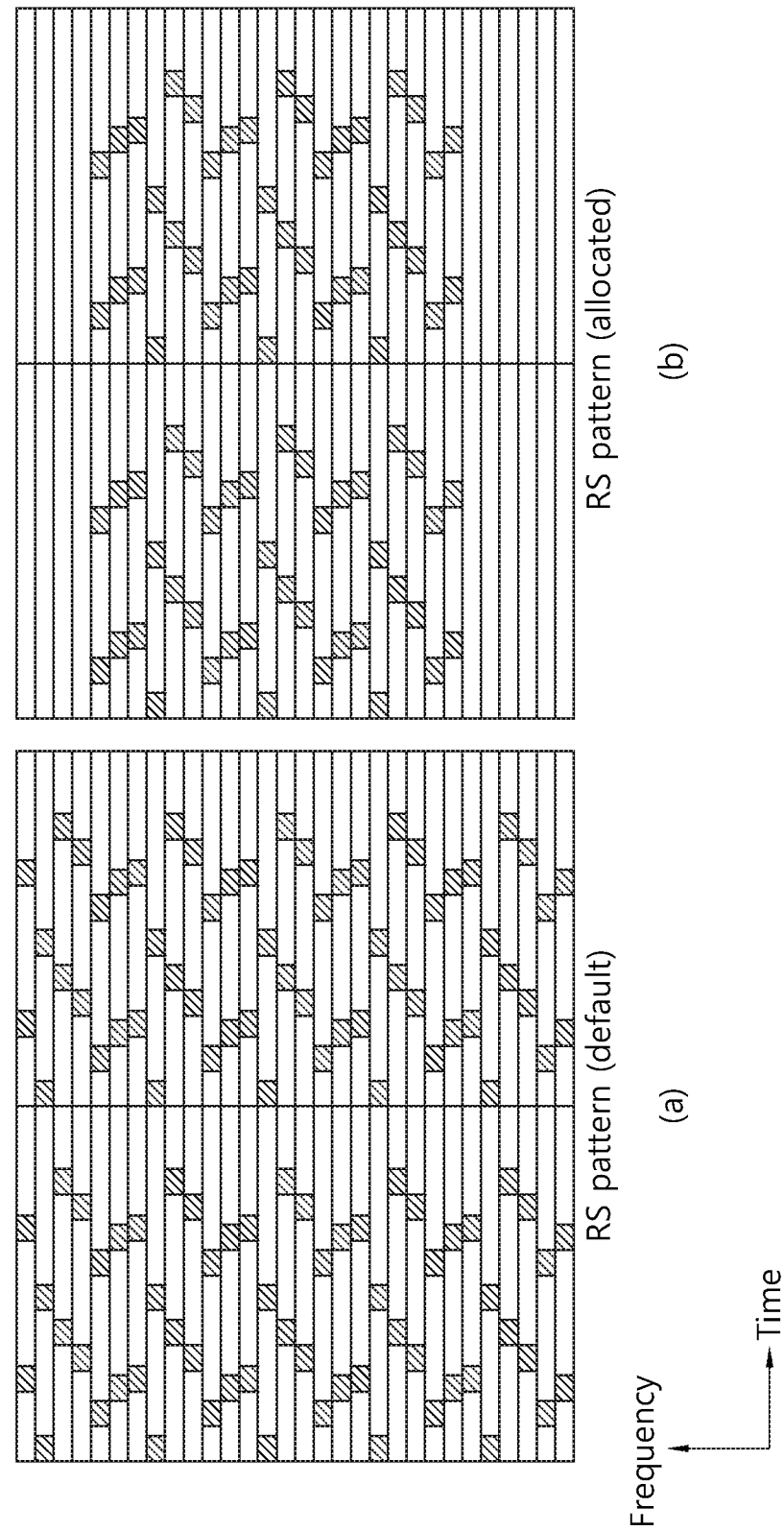
FIG. 5 shows an example of RS pattern according to an embodiment of the present invention.

FIG. 5 shows an example of RS pattern according to an embodiment of the present invention. Referring to FIG. 5, FIG. 5-(a) shows the default RS pattern. FIG. 5-(b) shows the allocated RS pattern, in which only subcarriers carrying data actually transmits RS as well.

For other SI transmission, similar approaches describe above may be considered. However, to reduce the latency of SI acquisition, different option for MI and SI respectively may be considered. For example, MI may be transmitted with repetition in a frame (i.e. option (1)), whereas SI may be transmitted once or none in a frame (i.e. option (2)).

Further, MI transmission may be common for all coverage class or coverage enhancement levels (i.e., for all UEs), whereas separate SI(s) may be transmitted per each coverage class. For example, SI-1 may correspond to coverage class 1, SI-2 may correspond to coverage class 2, and so on, where SI-1 . . . SI-m may be transmitted in a round-robin fashion. In other words, the first frame may transmit SI-1, the second frame may transmit SI-2, and so on. By separating SIs per coverage level, different content, e.g. configuration of control/data/physical random access channel (PRACH), etc. may be configured, while the code rate of each SI may be chosen optimally per each coverage class. Otherwise, SI may be transmitted targeting the worst case of coverage class which may lead some spectral efficiency degradation. However, this approach may be based on the assumption that a UE knows its coverage class before the UE access the SI which may be obtained via measurement. Also, this approach may be based on the assumption that coverage class of each UE may not change so often, and a UE does not need to know the configuration of other coverage class(es). It is further considerable that some SI(s) may be still commonly transmitted which contains overall information which are common regardless of coverage level. Those information may be carried over MI or one or more SI(s) can be formed to deliver such information.

Figure 6:
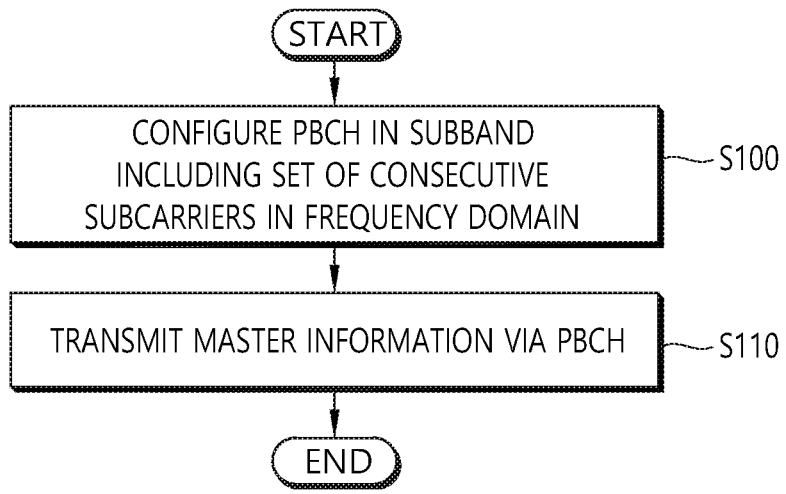
FIG. 6 shows a method for transmitting, by a BS, system information according to an embodiment of the present invention.

FIG. 6 shows a method for transmitting, by a BS, system information according to an embodiment of the present invention. This embodiment corresponds to option (2) for frequency location of PBCH for MI transmission, i.e. subband transmission.

In step S100, the BS configures a PBCH in a subband including a set of consecutive subcarriers in a frequency domain. The subband may be determined among a number of subbands in an entire system bandwidth. The subband may be determined based on a cell ID. A frequency hopping may be applied for the PBCH. A hopping pattern for the frequency hopping may be determined based on a cell ID. Further, a hopping pattern for the frequency hopping may be determined based on a frequency hopping offset. The frequency hopping offset may be determined based on the cell ID.

Further, for time location of PBCH for MI transmission, the master information may be transmitted repeatedly in a frame with PSS/SSS. Alternatively, the master information may be transmitted once in a frame. Alternatively, the master information may be transmitted repeatedly in a frame regardless of locations of PSS or SSS.

In step S110, the BS transmits master information via the PBCH.

Hereinafter, a DL control channel for CIoT according to an embodiment of the present invention is described.

For DL pilot pattern, it may be proposed to transmit pilot signals in all subcarriers allocated to a cell. As pilot signals are critical in terms of channel estimation and time/frequency tracking, some interference randomization among neighbor cells should be considered. Accordingly, different pattern of pilot signals may be used based on cell ID similar to Vshift used in the current LTE. Or, instead of Vshift, Hshift may be used where the starting symbol to carry pilot signal may be determined as (Cell ID % 8).

More specifically, within each normal slot, the pilot pattern may be determined based on cell ID. In odd-subcarrier, the starting symbol index may be determined as (cell ID % 8) and the second symbol index to carry the pilot signal may be determined as (cell ID % 8)+8. In even-subcarrier, the starting symbol index may be determined as ((cell ID+4) % 8) and the second symbol index may be determined as ((cell ID+4) % 8)+8.

For PDCCH contents, the content of a PDCCH may be differently configured depending on whether a PDCCH carries single DCI or multiple DCIs. At least for a DCI destined to a UE, the following fields/information may be necessary.

DL or UL: whether this DCI intends for DL scheduling or UL grant
Cell RNTI (C-RNTI, i.e. RNTI used for scheduling)
Subcarrier index or frequency location
Modulation and coding scheme (MCS) and/or transport block size (TBS)
Start indicator
Duration As PDCCH also carries acknowledge/non-acknowledge (ACK/NACK) information for UL transmission, further details on ACK/NACK transmission via PDCCH needs to be clarified. In one approach, ACK/NACK information of multiple UEs may be piggybacked with PDCCH message indicator (PI). Each PI may carry a bitmap of ACK/NACK where i-th bit indicates ACK/NACK of UL transmission scheduled with ACK/NACK index of i. For example, when UL grant is scheduled, the network may assign ACK/NACK index where the UE can locate it's ACK/NACK based on the allocated ACK/NACK index by UL grant. For another approach, the subcarrier index of scheduled UL grant may be used to locate the ACK/NACK resource. Otherwise, individual ACK/NACK may be transmitted via scheduling a DCI just for ACK/NACK. Or, only NACK may be indicated which will be accompanied with UL grant for retransmission. In case limited resources are used for PDCCH transmission, it would be desirable to consider either a common DCI carrying ACK/NACK information for UL transmission or consider NACK-only feedback.

Further, PDCCH resource per each coverage class may be configured separately. In this case, different subcarrier(s) may be allocated to each coverage class, and PDCCH resource per coverage class may be allocated to subcarrier(s) corresponding to each coverage class. In terms of PDCCH configuration, the set of subcarrier(s) (e.g. subcarrier index, the number of subcarriers), periodicity of PDCCH occasion, and duration may be configured per each coverage class.

It may be noted that resources are allocated for potential PDCCH transmission where unused resource may be used by PDSCH transmission.

In terms of transmission of PDCCH in each PDCCH occasion, it may be proposed to transmit a special DCI which may carry at least PI. DCI carrying PI (PI-DCI) may be scheduled in each PDCCH occasion. The size of PI-DCI may be fixed. For example, the size of PI-DCI may be one slot. The PI may include a size of K bits bitmap where K may be different per coverage class. Each UE may look up its ID on its coverage class to check whether there is potentially scheduled DCI or not in the current PDCCH occasion. To relax UE decoding processing capability, DCI scheduling of the next PDCCH occasion may be indicated instead of current occasion in PI. When a UE detects that there is no potentially scheduled DCI for the group where the UE belongs to, the UE may skip reading PDCCH occasion. Based on the timer of sleep mode (e.g. inactivity timer), a UE may go back to sleep if no activity is observed.

Figure 7:
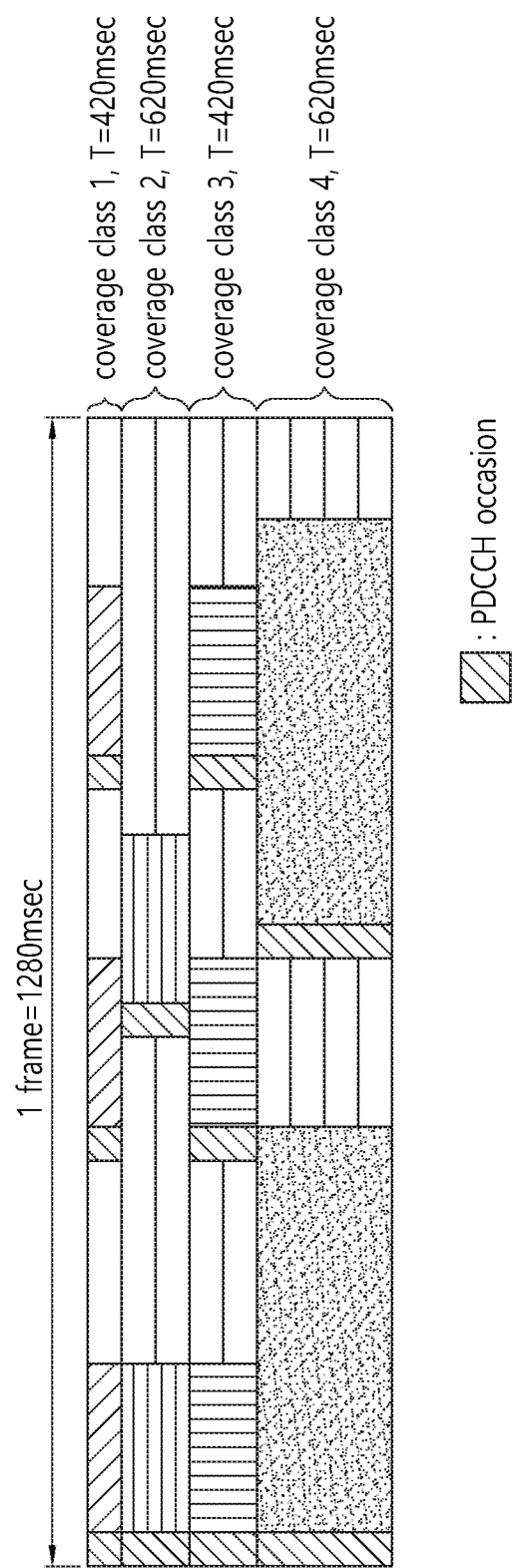
FIG. 7 shows an example of PDCCH occasion configuration per each coverage class according to an embodiment of the present invention.

FIG. 7 shows an example of PDCCH occasion configuration per each coverage class according to an embodiment of the present invention. Referring to FIG. 7, one subcarrier is allocated to coverage class 1, two subcarriers are allocated to coverage class 2 and 3, and four subcarriers are allocated for coverage class 4. That is, different subcarrier(s) are allocated to each coverage class. Further, PDCCH resource per coverage class is allocated to subcarrier(s) corresponding to each coverage class. PI-DCI may be mapped to each PDCCH resource corresponding to each coverage class. PI-DCI occupies one slot over subcarrier(s) allocated for each coverage class.

In terms of transmission of DCI in a PDCCH, one of the following approaches may be considered.

(1) Single DCI per PDCCH: It may be assumed that a PDCCH carries a single DCI. Thus, a UE may read a PDCCH to acquire its DCI if it is scheduled. In terms of allocating a potential resource block where PDCCH can be scheduled, to mitigate blocking issue, multiple candidates may be considered where a UE has to blindly search multiple candidates of resource blocks to locate the PDCCH. A UE may not have any PDCCH scheduled even though PI indicates a potential scheduling, as there are multiple UEs in the same group indicated by the same PI. To define multiple candidates of resource block, one candidate per PDCCH occasion may be assumed where multiple candidates over multiple PDCCH occasion may be considered within a frame. Or, multiple occasions per each PDCCH occasion may be considered which may increase the overall UE reading time. When multiple candidates are considered, different hashing function may be used per PDCCH occasion to minimize collision among same UEs. For example, if one frame has three PDCCH occasion, the index may be 0, 1, and 2, and the hashing function for a UE may follow Equation 2 below.

$$Y_k = (A * Y_{k-1}) \bmod D \qquad \text{Equation 2}$$

Where $Y_{-1} = N_{RNTI} \neq 0 A = 39827$, $D = 65537$, and $k = \{0,1,2\}$. The resource block that a UE can use may be determined as ($Y_k$ % M), where M is the number of resource blocks per PDCCH occasion.

(2) Multiple DCIs on a PDCCH: multiple DCIs of multiple UEs may be multiplexed in a PDCCH. By this approach, a UE needs to read the entire PDCCH to locate its own DCI. This approach may depend on the number of UEs scheduled together, the payload size changes, and power consumption to read a DCI can be different.

Figure 8:
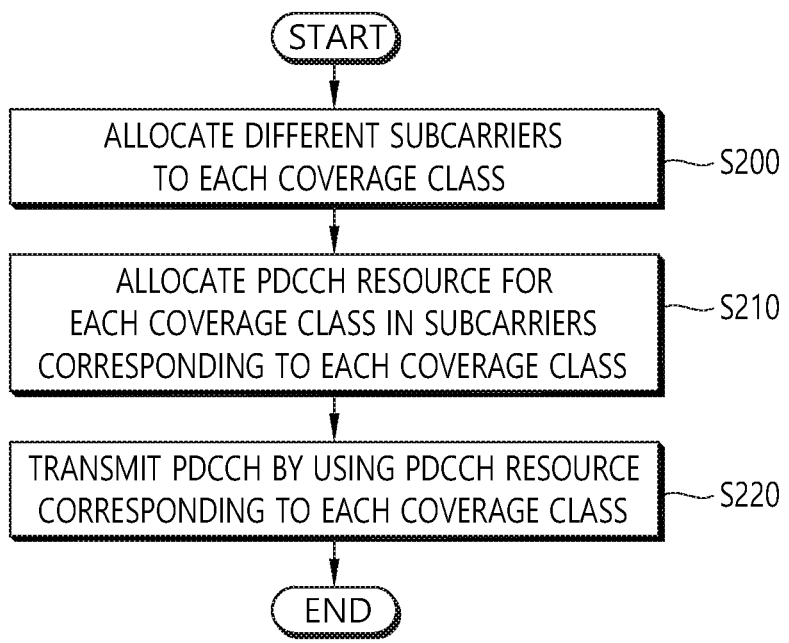
FIG. 8 shows a method for transmitting, by a BS, a PDCCH according to an embodiment of the present invention.

FIG. 8 shows a method for transmitting, by a BS, a PDCCH according to an embodiment of the present invention.

In step S200, the BS allocates different subcarriers to each coverage class. A number of subcarriers allocated to the each coverage class may be different from each other. Further, a subcarrier index and a number of subcarriers allocated to the each coverage class may be configured by the BS.

In step S210, the BS allocates a PDCCH resource for the each coverage class in subcarriers corresponding to the each coverage class. A periodicity and a duration of the PDCCH may be configured by the BS.

In step S220, the BS transmits the PDCCH by using the PDCCH resource corresponding to the each coverage class. The PDCCH may carry a PDCCH message indicator (PI).

Figure 9:
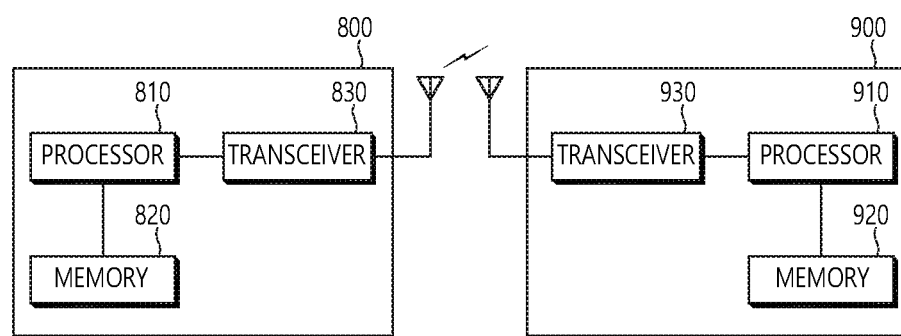
FIG. 9 shows a wireless communication system to implement an embodiment of the present invention.

FIG. 9 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a base station (BS), system information in a wireless communication system, the method comprising:
   selecting a specific subband among a number of subbands consisting of a system bandwidth, based on an identity (ID) of a cell and the number of subbands;
   configuring a physical broadcast channel (PBCH) in the specific subband by adapting frequency hopping across consecutive subcarriers in the specific subband,
   wherein a hopping pattern for the frequency hopping is determined based on a frequency hopping offset; and
   transmitting master information (MI) in the cell via the configured PBCH,
   wherein the hopping pattern and the frequency hopping offset are determined based on the ID of the cell and the number of subbands.

2. The method of claim 1, wherein the master information is transmitted repeatedly in a frame with a primary synchronization signal (PSS) or a secondary synchronization signal (SSS).

3. The method of claim 1, wherein the master information is transmitted once in a frame.

4. The method of claim 1, wherein the master information is transmitted repeatedly in a frame regardless of locations of PSS or SSS.

5. A base station (BS) comprising:
   a memory;
   a transceiver; and a processor, coupled to the memory and the transceiver, and configured to:
  select a specific subband among a number of subbands consisting of a system bandwidth, based on an identity (ID) of a cell and the number of subbands;
  configure a physical broadcast channel (PBCH) in the specific subband by adapting frequency hopping across consecutive subcarriers in the specific subband,
  wherein a hopping pattern for the frequency hopping is determined based on a frequency hopping offset; and
  control the transceiver to transmit master information (MI) in the cell via the configured PBCH,
  wherein the hopping pattern and the frequency hopping offset are determined based on the ID of the cell and the number of subbands.

* * * * *